US011089035B2

(12) United States Patent
Doron et al.

(10) Patent No.: US 11,089,035 B2
(45) Date of Patent: Aug. 10, 2021

(54) TECHNIQUES FOR PREDICTING SUBSEQUENT ATTACKS IN ATTACK CAMPAIGNS

(71) Applicant: RADWARE, LTD., Tel Aviv (IL)

(72) Inventors: Ehud Doron, Moddi'in (IL); Amnon Lotem, Ramot Hashavim (IL); Yotam Ben-Ezra, Ra'anana (IL); Ami Navon, Tel Aviv (IL); Nadav Grossaug, Ra'anana (IL); Nissim Pariente, Kiryat Ono (IL)

(73) Assignee: Radware Ltd., Tel Aviv (IL)

( * ) Notice: Subject to any disclaimer, the term of this patent is extended or adjusted under 35 U.S.C. 154(b) by 135 days.

(21) Appl. No.: 16/215,878

(22) Filed: Dec. 11, 2018

(65) Prior Publication Data

US 2019/0182274 A1 Jun. 13, 2019

Related U.S. Application Data (60) Provisional application No. 62/597,180, filed on Dec. 11, 2017.

(51) Int. Cl.
| | |
|---|---|
| *H04L 29/00* | (2006.01) |
| *H04L 29/06* | (2006.01) |
| *G06N 3/08* | (2006.01) |
| *G06N 3/04* | (2006.01) |

(52) U.S. Cl.
CPC ........... *H04L 63/1416* (2013.01); *G06N 3/04* (2013.01); *G06N 3/08* (2013.01); *H04L 63/1458* (2013.01); *H04L 2463/142* (2013.01)

(58) Field of Classification Search
CPC . H04L 63/1416; H04L 63/1458; H04L 63/14; H04L 63/1425; H04L 63/145; H04L 63/1441; H04L 2463/14; G06N 3/04; G06N 3/08
See application file for complete search history.

(56) References Cited

U.S. PATENT DOCUMENTS

| | | | | |
|---|---|---|---|---|
| 2016/0182544 | A1* | 6/2016 | Adjaoute | G06F 21/577 |
| | | | | 705/7.15 |
| 2017/0019419 | A1* | 1/2017 | Kholidy | G06F 21/00 |
| 2020/0059487 | A1* | 2/2020 | Malik | H04L 9/0643 |

OTHER PUBLICATIONS

Man Da-peng, Li Xue-Zhen, Zang Wu, Wang Wei, Xuan Shi-chang, "A Multi-step Attack Recognition and Prediction Method Via Mining Attacks Conversion Frequencies", Research Association of Modern Education and Computer Science, 2012 Published by MECS Publisher, pp. 20-25. (Year: 2012).*

(Continued)

*Primary Examiner* — Joseph P Hirl
*Assistant Examiner* — Chi D Nguy
(74) *Attorney, Agent, or Firm* — M&B IP Analysts, LLC (57) ABSTRACT

A method and system for predicting subsequent cyber-attacks in attack campaigns are provided. The method includes receiving events data related to cyber-attacks occurring in a network during a predefined time window; extracting at least one sequence from the received events data at least one attack vector; generating a sequence signature for each of the at least one extracted sequence; comparing each sequence signature to a representation of historic sequence signatures to determine at least partially matching sequence signature; and based on the matching sequence, determining at least one subsequent cyber-attack in a respective sequence.

23 Claims, 4 Drawing Sheets

(56) References Cited

OTHER PUBLICATIONS

Manisha Bharati, Dr. Santosh Lomte "A Survey on Hidden Markov Model (HMM) Based Intention Prediction Techniques", Int. Journal of Engineering Research and Applications, Jan. 2016, pp. 167-172 (Year: 2016).*

* cited by examiner

TECHNIQUES FOR PREDICTING SUBSEQUENT ATTACKS IN ATTACK CAMPAIGNS

CROSS-REFERENCE TO RELATED APPLICATIONS

This application claims the benefit of U.S. Provisional Application No. 62/597,180 filed on Dec. 11, 2017, the contents of which are hereby incorporated by reference.

TECHNICAL FIELD

The present disclosure relates generally to cyber-security solutions, and more particularly to prediction of subsequent attacks in attack campaigns.

BACKGROUND

A significant problem facing the Internet community is that online businesses and organizations are vulnerable to malicious attacks. Cyber-attacks have been executed using a wide arsenal of attack techniques and tools targeting both the information maintained by the online businesses and their IT infrastructures. Cyber-attacks typically aim to steal data, disable applications and/or services, and damage online assets of organizations.

The cyber-attacks are performed in an attempt to exploit any potential vulnerability in systems, applications, services, and networks of an organization. For example, recently identified cyber-attacks have been executed using a combination of attack techniques at the network and application levels. Attackers use different attack tools to execute different attack techniques. Each such attack tool is designed to exploit weaknesses identified in one of the target's defense layers.

Over time, cyber-attackers have developed increasingly sophisticated techniques for disrupting target systems and services. One example of increasing sophistication of cyber-attacks is the rise of attack campaigns in which multiple attacks are utilized to exploit security weaknesses. In particular, a series of different types of attacks may be utilized to reveal and exploit vulnerabilities.

In order to protect their online assets, organizations have deployed a variety of security devices and services (collectively referred to as security devices or a security device). The security devices are selected to protect different segments of the networks and to handle different types of cyber-attacks. For example, security devices can be utilized to detect intrusion attempts, malwares, bots, execution of denial-of-service (DoS) attacks, HTTP or HTTPS flood attacks, attacks against web applications, and so on.

Each such security device typically generates a high number of events. An event may include, for example, an indication on detection of an attack and various details of the detected attack, breach of a security policy, detection of suspicious behavior, and so on. Due to the high volume of security events, a security administrator in an organization cannot manually process and analyze the generated events in an effective manner.

In order to ease the management of security events, security information and event management (SIEM) systems have been introduced. Such systems provide a holistic view of an organization's security devices by gathering all events from the different devices and reporting the gathered events through a single interface. A SIEM system may not solve problems related to the high volume of events to be analyzed, as the analysis and monitoring of events should still be performed by a user (e.g., a security administrator). As a result, only a small percentage of the total number of security events generated by the security devices is analyzed. Further, even if the SIEM system provides adequate events analysis, it still cannot predict subsequent attacks that follow past and present security events.

This relatively low percentage of analysis is a major drawback, as lack of such analysis often results in a high number of false positives, misdetection of attacks, inability to distinguish between critical and uncritical events, misused investment of detection resources, and so on. Specifically, the lack of attack prediction does not allow for early detection of attacks before they occur, nor does it allow harm to various protected objects of the organization.

Typically, a cyber-attack can span a sequence of attack events which amount to an attack incident. The attack events may be associated with different stages of the incident or different targets of the attack campaign within an organization. Each stage or part of the attack incident may be identified and reported as attack events by a different security device deployed in the network.

As an example, a DDoS burst attack incident is a sequence of high traffic volumes communicated in bursts. A sequence of attack events would include events indicating intermittent bursts of attack traffic followed by pauses. As another example, a sequence of attack events can begin with events related to information gathering, continue with lateral movement, and then end in data exfiltration. As yet another example, an attack can start with application scanning, followed by intrusion attempts, and then a DDoS attack.

Existing solutions include security devices that independently report events upon detection of such events. However, the security devices cannot identify a pattern of an attack incident as they are not configured to analyze patterns of events detected with respect to different devices. As noted above, such analysis cannot be performed by an administrator due to the high volume of events and the complex analysis required. As such, cyber-attacks may not be detected early or be accurately predicted. For example, identification of events related to application scanning that is part of an identified pattern, can indicate an in-coming DDoS attack. However, current solutions cannot identify newly discovered attack patterns and cannot predict cyber-attacks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for predicting subsequent cyber-attacks in attack campaigns. The method includes receiving events data related to cyber-attacks occurring in a network during a predefined time window; extracting at least one sequence from the received events data at least one attack vector; generating a sequence signature for each of the at least one extracted sequence; comparing each sequence signature to a representation of historic sequence signatures to determine at least partially matching sequence signature; and based on the matching sequence, determining at least one subsequent cyber-attack in a respective sequence.

Certain embodiments disclosed herein include a system for cataloging a database metadata using a signature matching process. The system comprises a processing circuitry; and a memory, the memory containing instructions that, when executed by the processing circuitry, configure the system to: receive events data related to cyber-attacks occurring in a network during a predefined time window; extract at least one sequence from the received events data at least one attack vector; generate a sequence signature for each of the at least one extracted sequence; compare each sequence signature to a representation of historic sequence signatures to determine at least partially matching sequence signature; and determine, based on the matching sequence, at least one subsequent cyber-attack in a respective sequence.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for detecting future or subsequent cyber-attacks which may be part of an attack campaign. The prediction is based on processing of events associated with a detected attack.

For ease of the description of the disclosed embodiments, the following terms are defined. An attack is a cyber-attack detected by a detector. Any detected attack is typically reported with its type, attributes, and a target (protected entity) of the attack.

An attack campaign (or sequence) is a sequence of attacks on a target which occur in temporal proximity or during a predefined time period. A time window vector represents the DDoS attacks that occurred within a time window. Typically, each element in the time window vector represents a distinct attack type of an attack that occurred during the time window, optionally with related attributes. A sequence signature is an internal representation of a sequence of attacks that are part of an attack campaign. The sequence signature can be used for efficient comparison between sequences of attacks. In an example implementation, an attack, a cyber-attack, and an attack campaign discussed herein are performed using distributed denial-of-service (DDoS).

Figure 1:
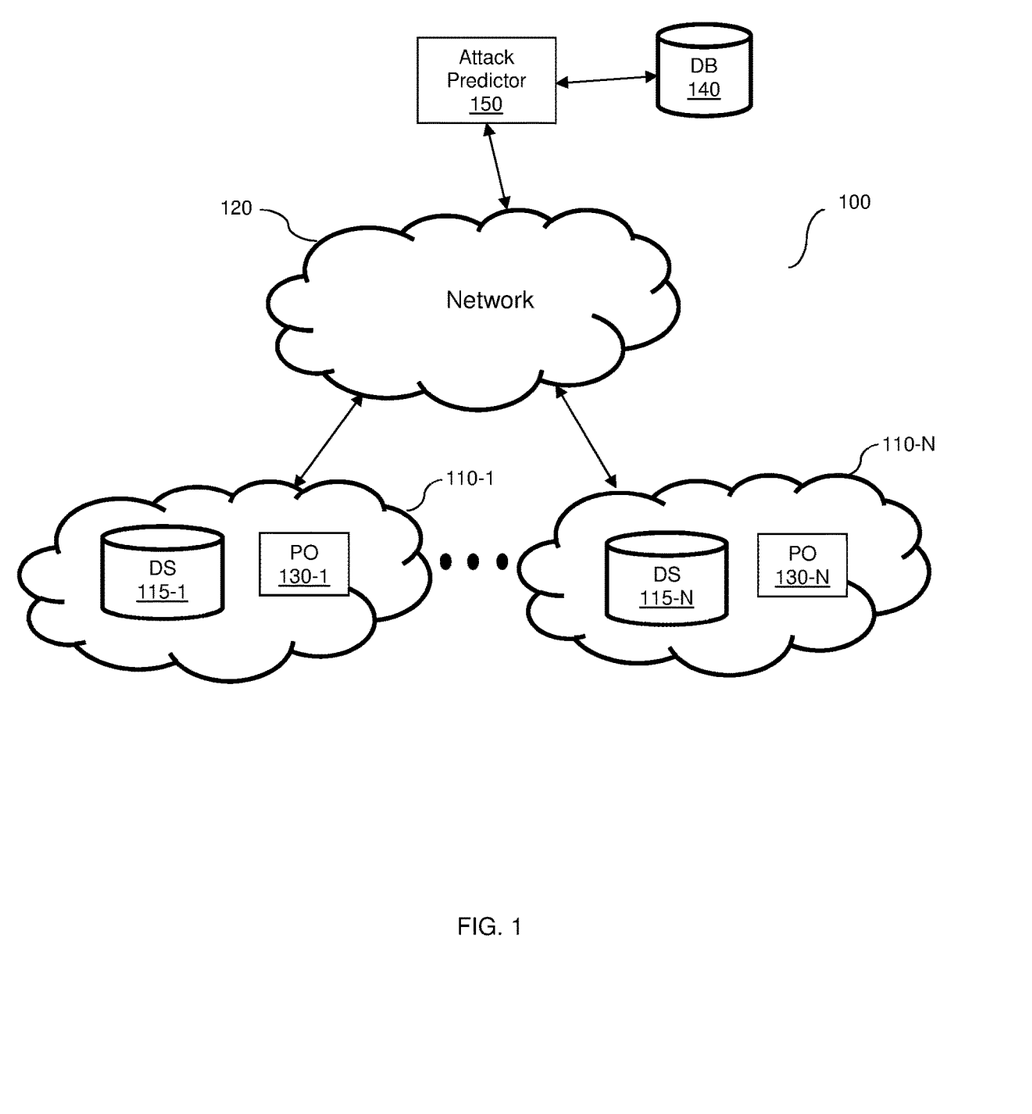
FIG. 1 is a network diagram utilized to describe the various disclosed embodiments.

FIG. 1 shows an example network diagram 100 utilized to describe the various disclosed embodiments. The network diagram 100 includes protected environments 110-1 through 110-N (hereinafter referred to individually as a protected environment 110 and collectively as protected environments 110, merely for simplicity purposes) communicatively connected to an attack predictor 150 via a network 120. In some configurations, the attack predictor 150 may be deployed in the enterprise network or as a cloud service.

Each protected environment 110 includes, but is not limited to, a data source (DS) 115 and a protected object 130 (hereinafter referred to individually as a data source 115 and a protected object 130, respectively, or collectively as data sources 115 and protected objects 130, respectively). The protected environments 110 may further include, but are not limited to: a wireless, cellular or wired network, a local area network (LAN), a wide area network (WAN), a metro area network (MAN), the Internet, the worldwide web (WWW), similar networks, and any combination thereof. In an example implementation, each protected environment may be a cloud computing environment.

The protected objects 130 can be under the administration of various organizations such as enterprises, service providers, cloud providers, SMBs, and the like. The protected objects 130 may be servers (e.g., web servers, application servers, etc.), networks, network devices (e.g., routers, switches, etc.), client devices (e.g., desk-top computers, mobile devices, etc.), databases, applications, services, and so on. In an embodiment, the protected objects can be related to different entities (e.g., customers, tenants, networks, administrations, domains, and the like). In another embodiment, a protected object 130 can be the infrastructure itself, for example, the protected object 130 may be the network 120 itself and the particular elements protected can be various network elements like switches, routers, their interfaces, and the like.

The network 120 may be, but is not limited to, a wireless, cellular or wired network, a local area network (LAN), a wide area network (WAN), a metro area network (MAN), the Internet, the worldwide web (WWW), a cloud network, an enterprise network, a datacenter, a service provider network, similar networks, and any combination thereof. It should be noted that the network 120 may include a combination of different networks. The network 120 or portions thereof may be a virtual network, a software defined network (SDN), and the like.

In some implementations, each of the protected environments 110 may be owned or operated by a different entity other than the protected environments 110. For example, a first protected environment may be owned by a first customer company, while a second protected environment 110-2 may be owned by a second customer company.

The disclosed embodiments provide for predicting the next step or attack of an attack campaign based on events of individually detected DDoS attacks and enrichment data. The data sources 115 generate or collect events data related to attacks. The events data may include events, event parameters, or both. To this end, the data sources 115 may include, but are not limited to, databases, security devices, DDoS attack detectors or mitigators, security information and events management (SIEM) systems, WAF services, user devices, sources of NetFlow data (e.g., from switch routers), sources of deep packet inspection (DPI) data, case management systems (of, e.g., SOC or NOC) combinations thereof, and the like. The data sources 115 may be third party services such as threat intelligence, DarkNet intelligence, known attacks repositories, and so on. The data sources 115 may be configured to store the events parameters in the database 140, to send the events to the attack predictor 150, or both.

In some implementations, one or more of the data sources 115 may be a security device configured to defend one of the protected objects 130, to detect or mitigate a particular type of cyber-attack, or both. Further, each data source 115 may be configured to detect or mitigate a different type of cyber-attack. As an example, a data source 115 may be a security detection system, such as an intrusion protection systems (IPS), a web application firewall (WAF), a network firewall, a database (DB) security system, a DoS/DDoS detection or mitigation device, an endpoint security system (e.g., anti-virus software), cloud workload protection systems, and the like.

An event can be generated upon, for example, detection of an attack (e.g., a DDoS attack), breach of a security policy, detection of suspicious behavior, and so on. An event encapsulates information such as, but not limited to, device type and vendor, event type, event description and metadata, date, time, network addresses, and so on. Each event may represent an attack. Events generated by different data sources 115 may contain different pieces of information, may be realized in a different format, or both. In particular, events generated or collected by data sources 115 owned by different entities associated with the protected environments 110 may be different. In an embodiment, event parameters of the events provided by the different data sources 115 are stored in a database 140. In some implementations, the database 140 may be communicatively connected to the network 120. In another embodiment, the database 140 may be located at public cloud data storage services.

According to the disclosed embodiments, the attack predictor 150 is configured to determine future attack steps of an attack campaign based, in part, on data provided by the data sources 115. Specifically, the prediction requires event data of individual attacks directed at a protected object 130. In an embodiment, the attack predictor 150 is configured to extract sequences of attacks out of sets of individual attacks. In an embodiment, the sequences are extracted from events data of attacks occurring within a time window.

The attack predictor 150 is configured to create sequence signatures. In an embodiment, the sequence signatures are generated using an embedding process. Based on the created sequence signature(s), the subsequent step or attack of an attack campaign is determined. In an embodiment, the determination is performed by comparing the newly created sequence to learned sequences. In an embodiment, the attack predictor 150 may be configured further to determine if a mitigation action should be performed to handle the predicted next type of attack. In other implementations, the attack predictor 150 may be configured to perform the suggested mitigation actions. The operation of the attack predictor 150 is discussed in greater detail below.

As a non-limiting example: when an incoming attack vector represents a DoS bursting attack, followed by a flooding attack, and the attack vector is matched to a sequence signature representing a DoS bursting attack, followed by a flooding attack then by a brute force attack, the sequence signature may designate the brute force attack as the next step in the attack campaign.

It should be noted that the embodiments disclosed herein are not limited to the specific architecture illustrated in FIG. 1, and that other architectures may be equally used without departing from the scope of the disclosed embodiments. Specifically, the attack predictor 150 may reside in a cloud computing platform, a datacenter, on premises, and the like. Moreover, in an embodiment, there may be a plurality of attack predictors 150 operating as described hereinabove and configured to either have one as a standby device to take control in a case of failure, to share the load between them, or to split the functions between them.

Figure 2:
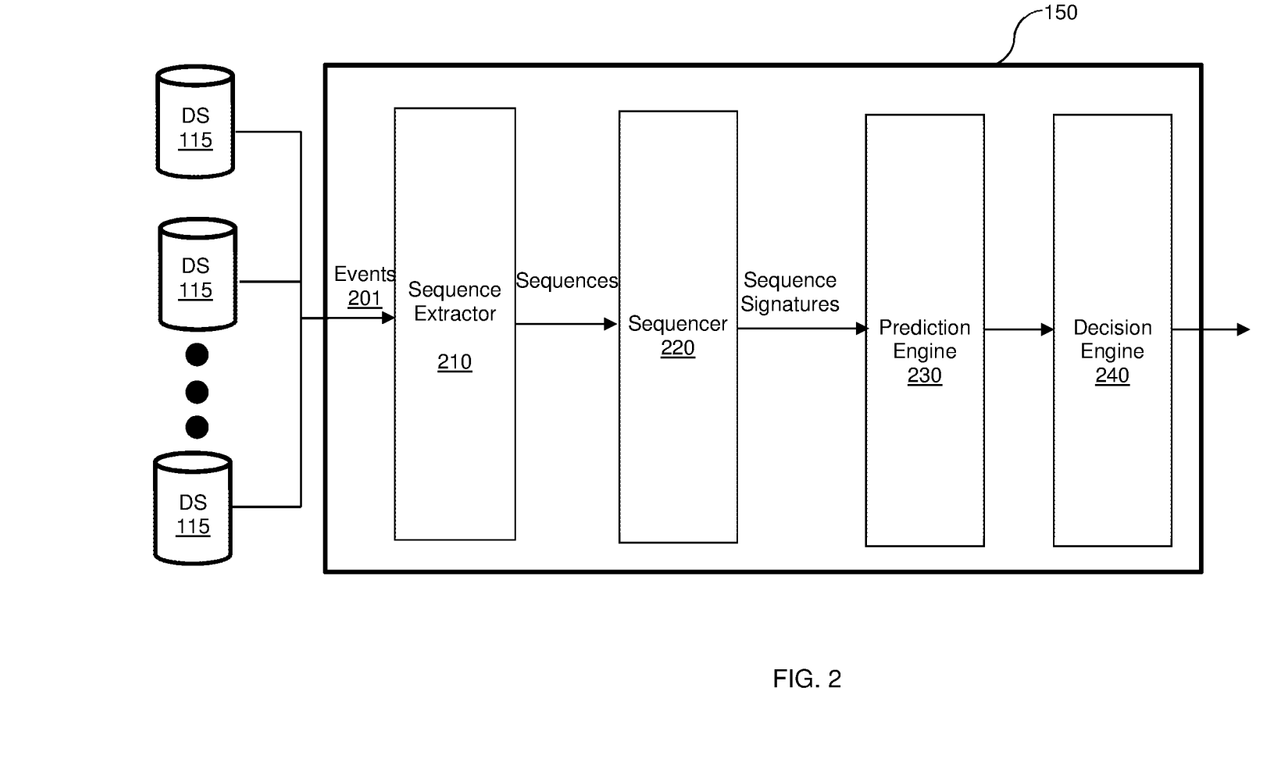
FIG. 2 is a flow diagram illustrating predicting attack patterns via machine learning according to an embodiment.

FIG. 2 is an example flow diagram 200 illustrating the operation of the attack predictor 150 according to an embodiment. The attack predictor 150 includes a sequence extractor 210, a sequencer 220, a prediction engine 230, and a decision engine 240. The inputs to the attack predictor 150 are events (201) received from a plurality of different data sources 115 such as, but not limited to, security devices (SDs), databases, SIEM systems, NOC/SOC managers, and the like. An event typically indicates, for example, detection of an attack, breach of a security policy, detection of suspicious behavior, and so on. An event may carry information related to an event type, an attack type, an attack bandwidth, an attack duration, event description, date, time, network addresses, combinations thereof, and so on, or any information that may characterize the attack. The received events may be normalized such that the data encapsulated therein is presented in the same format and notation.

The sequence extractor 210 is configured to extract sequences of attacks out of sets of individual attacks. The attacks within each sequence relate to a common targeted protected object (e.g., one of the protected objects 130, FIG. 1). The attacks within the sequence are ordered according to time (typically, with respect to the start time of the attack). Each attack in the sequence has an attack type, start time and end time, and optionally a set of attributes such as source IP address, geo location information, number of bytes and packets that were involved in the attack, and so on.

The extraction of sequences can be performed in a batch mode, for example when the attacks reside in files. In another embodiment, the extraction could be performed on a stream of attacks performed in real time or near real time. The criteria for grouping attacks into a sequence can be some predefined time duration, e.g., sequences of length 1 hour, 6 hours, or 24 hours.

Overlapping sequences may be created with some time shift between sequences. Alternatively, the criteria may include creating sequences in which the time gap in between attacks is below a predefined time threshold.

The sequencer 220 is configured to generate sequence signatures using an embedding process. The sequencer 220 and, hence, the predictor 150 may operate in two modes: learning and predicting. In the learning mode, an embedding model (e.g., neural network), is trained, and sequence signatures are created using the embedding model for historic sequences.

In an embodiment, the sequencer 220 is configured to perform the embedding processing using a neural network-based process or an n-grams based process. When utilizing the neural network based embedding process, the sequencer 220 may represent each attack in the sequence as a number or an array of numbers. The number (or an array of numbers) may encode, for example, attack attributes. The attack attributes may include an attack type, source IP address, geo location information, the number of bytes, and the number packets involved in the attack, the duration of the attack, the time gap since the previous attack, and so on.

The sequence is represented using a vector of numbers or arrays of numbers that represent the attacks. A deep learning neural network model is used to transform the vector or array of numbers into a sequence signature.

In one embodiment, the sequence signature is a vector of real numbers. In this embodiment a layers of long short-term memory (LSTM) Neural Network is used to create the sequence signature. In this embodiment, the vector of numbers (or arrays of numbers) representing the sequence is fed forward into the LSTM network. The values appear in one of the hidden layers of the Neural Network (e.g., the last one) and are used as the embedded representation of the sequence. This embedded representation is the sequence signature.

To train the LSTM neural network, the LSTM neural network is fed with a relatively large set of historic sequences. For each sequence, the LSTM neural network is fed with the 'n−1' first elements of the vectors (numbers or arrays of numbers) and is expected to predict the n-th element of the vector, where 'n' is the number of attacks in the sequence, i.e., in the process no labels are required for the sequences. The neural network is trained to learn the subsequent attack.

It should be noted that by utilizing this training, a neural network is created. In such network one of its hidden layers (e.g., the last layer), is used as the embedded representation of sequences.

In one embodiment, the embedding process includes aggregating all the attacks that occurred in a predefined time window (e.g., 5 minutes or one hour) into a time window vector. Each position of the time window vector encodes a distinct attack type of an attack that occurred during the time window. The attack in the vector can be represented using a bit, a number, or an array of numbers. The bit or number represents the attack type. The array of numbers can represent the attack type and attributes of the attack type, in that time window such as a source IP address or geo-location information, the number of bytes and the number packets involved in the attack, the duration of the attack, the time gap from the previous attack, and so on.

When embedding into vectors, the sequence is represented using a vector of time window vectors, where each element in each time window vector represents a distinct attack that occurred in the time window (as a number or array of numbers). As described above, a deep learning neural network model is then used to transform the vector of time window vectors into a sequence signature. In an embodiment, the sequence signature is a vector of real numbers created using a LSTM Neural Network.

It should be appreciated that neural network autoencoders, LSTM autoencoders, or convolutional autoencoders can also be used to train a network that has its hidden layer (e.g., central layer), being used for the embedding process.

In another embodiment, an n-gram based process is utilized. In this embodiment, a sequence is broken into a set of overlapping n-grams, wherein each n-gram is a subsequence of a length 'n'. The value of 'n' is typically an integer between 2 and 6. For example, the 3-grams (trigrams) of the sequence 'abcde' are: 'abc', 'bcd', and 'cde'.

The attacks appearing in the sequence are represented using predefined codes (each attack type may be assigned with a different code). The n-grams may hold attack attributes of the respective attacks.

The prediction engine 230 is configured to determine the subsequent potential step (or attack) in an attack campaign. Generally, the determination is based on a newly created sequence signature compared to learned sequence signatures. The comparison can be performed using several possible methods.

In an embodiment, the comparison is performed using similar historic sequences in which the engine may search for similar historic sequences, and predict based on the continuation attacks of the historic sequences. Historic sequences may be saved in a data repository. Specifically, the engine 230 may search for similar historic sequence matching a newly created sequence (current sequence signature). The search is performed by comparing the sequence signature representing the current sequence and of the sequence signatures of historic sequences. The search can be performed, by comparing all historic sequence signatures (in some time period), or to be more efficient, by using some auxiliary data structures such as trees and hash tables. Auxiliary data structures such as trees and hash tables may be built beforehand, during the learning period, from the historic sequences (and their sequence signature representations) to make the search more efficient during the prediction phase.

The distance metric (for checking the similarity) may be, for example, a cosine similarity between vectors, where the vectors represent sequence signatures or the cluster centroid.

Alternatively, the distance metric may relate to the rate of common n-grams between two sequence signatures (provided n-grams used for the sequence signature representation). Some similarity between associated attributes of the n-grams may also be used.

When at least one matching historic sequence is found based on the matching portions of sequence signatures, the subsequent attacks of the matching historic sequence are predicted as potential continuations (i.e., attacks that are likely to follow the current sequence) for the current sequence (attack campaign). A match may be defined when the distance metric is less than a predefined threshold embodiment.

In an embodiment, a confidence score or probability can be assigned to the predicted attacks based on the rate of sequences in the cluster that pointed to each attack as a possible continuation.

In another embodiment, the search is performed using matching clusters. That is, a search for a matching cluster of historic sequences is performed, and subsequent attacks are predicted based on the continuation attacks of the historic sequences in the matching cluster. Specifically, in this embodiment, the prediction engine 230 may match between a current sequence and a cluster of historic sequences. The matching uses the sequence signature representation of the current sequence and of the cluster centroid. That is, the prediction engine 230 may search for a close enough cluster to the current sequence with respect to a distance metric. The distance metric may be, for example, a cosine similarity between vectors, where the vectors represent individual sequence signatures or the cluster centroid.

Alternatively, the distance metric may relate to the rate of common n-grams between two sequence signatures (provided n-grams used for the sequence signature representation). Some similarity between associated attributes of the n-grams may also be used.

In an embodiment, when at least one historic sequence is found, the continuation attacks of the respective historic sequence are predicted as potential continuations for the current sequence (attack campaign). A match may be defined when the distance metric is less than a predefined threshold embodiment. A confidence score or probability may be assigned to the predicted attacks, based on the rate of sequences in the cluster that pointed on an attack as a possible continuation.

It should be noted that the clusters have to be built beforehand, during a learning period, from a relatively large number of historic sequences. Traditional machine learning techniques can be used for the clustering, working at the sequence signature level (as a representation of the sequence), and using distance metrics like cosine similarity and rate of common n-grams.

In yet another embodiment, a machine-learning model such as, but not limited to, LSTM is utilized to predict the subsequent attack or attacks. The LSTM model has to be trained beforehand based on a relatively large number of historic sequences and, once trained, may be utilized to predict the attack (or attacks) that continue the sequence (these attacks are known in training time). The training may be performed as training of the sequencer 220.

The decision engine 240 is configured to determine mitigation actions to be performed. The determination may be based on a security policy of a protected object, a rank of the predictive sequence signature, the potential continuations determined for the current attack campaign, and so on. The mitigation actions may include actions for preventing or reducing harm from the predicted attacks. As a non-limiting example, when the predicted attacks include an upcoming network time protocol (NTP) flood attack, the determined mitigation actions may include techniques for filtering traffic from forged source addresses (e.g., ingress filtering).

All or some elements shown in FIG. 2 can be implemented by hardware logic components and circuits. For example, and without limitation, illustrative types of hardware logic components that can be used include: field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Figure 3:
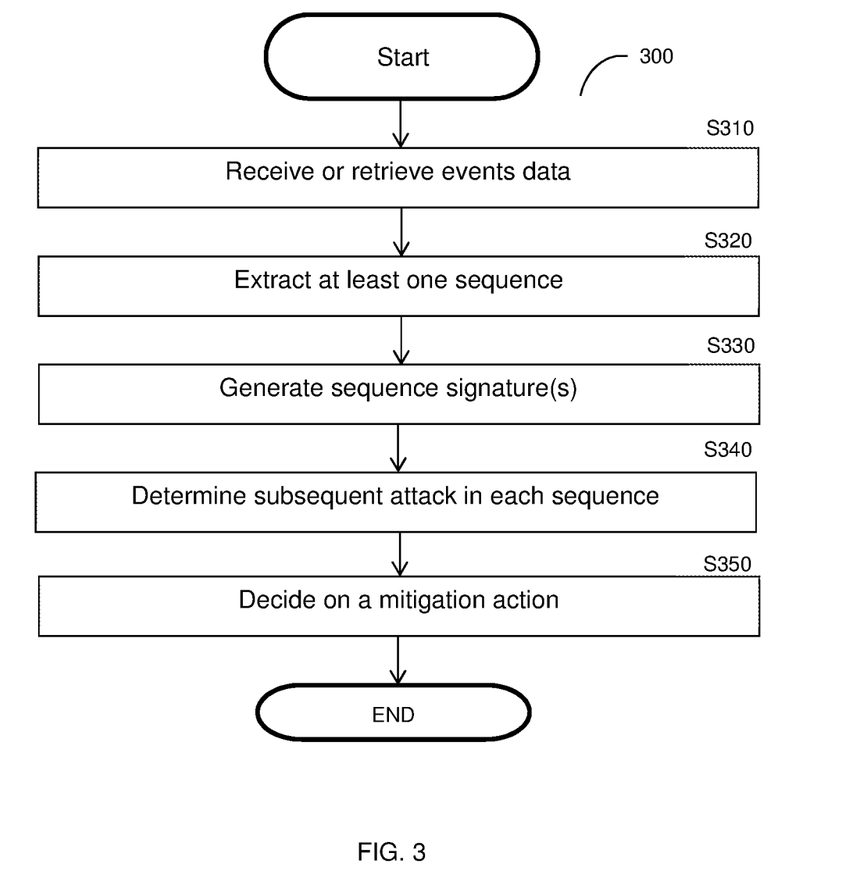
FIG. 3 is a flowchart illustrating a method for predicting cyber-attacks according to an embodiment.

FIG. 3 is an example flowchart 300 illustrating a method for predicting subsequent attacks in an attack campaign according to an embodiment.

Prior to execution of the method, historic sequences (attack campaigns) are learned based on individual attacks performed during a time window vector. The learning of sequences may be performed using the embedding process discussed in detail above. In some embodiments, the learning may be performed offline, at a remote time from the other steps of the method of FIG. 3, or both. In an embodiment, the learning may be performed repeatedly to adapt to sequence signatures of new attack campaigns.

At S310, incoming events data is received or retrieved from the data sources (e.g., sources 115). The events data may be received continuously, thereby allowing for real-time prediction of subsequent attacks during an attack campaign. In another embodiment, the events data are received in batches. In an embodiment, the events data may be enriched with data gathered from external data sources.

At S320, at least one sequence is extracted from the events data. The events data represents individual attacks that occurred during a predefined time window and targeted the same protected object. Thus, the sequence includes a series of attacks that occurred during the same time window and against the same target. The extraction of sequences can be performed in real time, in near real time, or based on the stored events data.

At S330, for each sequence created at S320, a sequence signature is created. The sequence signature is generated using an embedding process discussed in detail above.

At S340, the subsequent attack or attacks in each extracted sequence is determined based on the learned sequences (historic sequences) and each of the current extracted sequences. The determination of predicted subsequent attacks can be performed by searching for similar historic sequences, by searching for a matching cluster, or by using a machine-learning model. The various prediction techniques are discussed in detail above. Each prediction, i.e., subsequent attack or attacks, may be assigned a confidence score.

At S350, it is determined if any mitigation action should be taken to block the predicted attack. The decision may be based on the protected object under attack, the type of the predicted, the confidence score, or a combination thereof. If it is determined that a mitigation action should be taken, S350 may further include determining the mitigation action to be taken.

Figure 4:
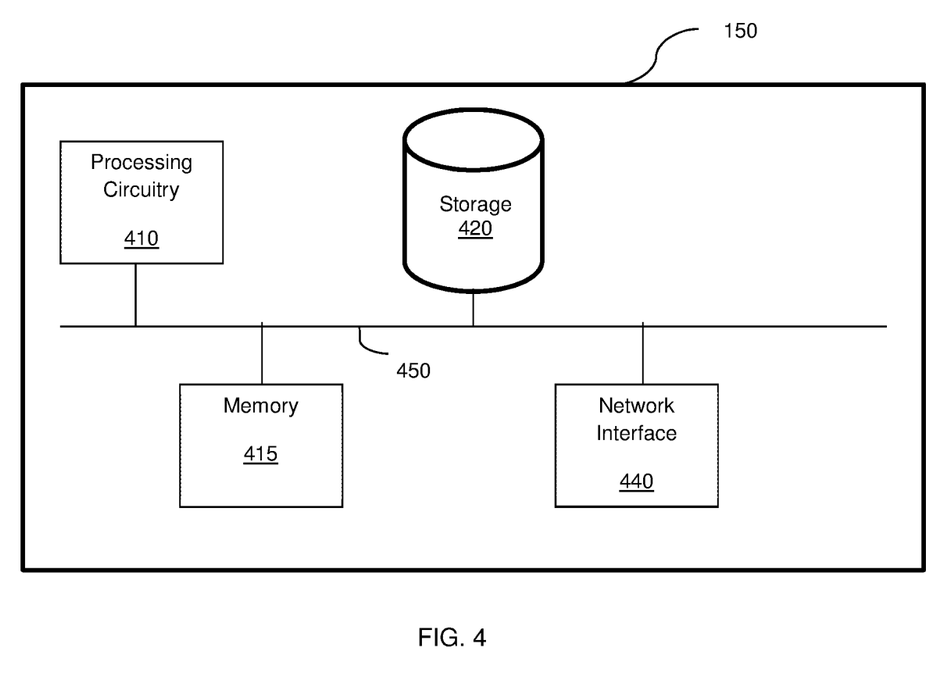
FIG. 4 is a schematic diagram illustrating an attack predictor according to an embodiment.

FIG. 4 is an example schematic diagram of the attack predictor 150 according to an embodiment. The attack predictor 150 includes a processing circuitry 410 coupled to a memory 415, a storage 420, and a network interface 440. In an embodiment, the components of the attack predictor 150 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 415 may be volatile (e.g., RAM, etc.), non-volatile (e.g., ROM, flash memory, etc.), or a combination thereof. In one configuration, computer readable instructions to implement one or more embodiments disclosed herein may be stored in the storage 420.

In another embodiment, the memory 415 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein.

The storage 420 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the attack predictor 150 to communicate with the data sources 115, the protected objects 130, the database 140, or a combination thereof for the purpose of, for example, receiving and retrieving events data. Additionally, the network interface 440 allows the attack predictor 150 to communicate with defense systems among the data sources 115, the protected objects 130, or both, for predictions of subsequent attacks, suggested mitigation actions, or both.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for predicting subsequent cyber-attacks in attack campaigns, comprising:
   receiving events data related to cyber-attacks occurring in a network during a predefined time window;
   extracting at least one sequence of attacks from the received events data at least one attack vector;
   generating a sequence signature for each of the at least one extracted sequence using an embedding process based on a trained embedding model;
   comparing each sequence signature to a representation of historic sequence signatures to determine at least partially matching sequence signature; and
   based on the matching sequence, determining at least one subsequent cyber-attack in a respective sequence.

2. The method of claim 1, wherein the sequence includes a series of cyber-attacks occurred during the same time window and against a targeted protected object.

3. The method of claim 1, wherein the embedding process to generate the sequence signature is an n-grams-based process.

4. The method of claim 3, wherein the n-gram-based embedding process further comprising:
   breaking a sequence into a set of overlapping n-grams, wherein each n-gram is a sub-sequence of a length 'n', wherein an 'n' is an integer number; and
   encoding the set of overlapping n-grams with attack attributes of the respective cyber-attack.

5. The method of claim 1, wherein the embedding process is a neural network-based process.

6. The method of claim 5, wherein the neural network-based embedding process includes:
   representing each cyber-attack in the extracted sequence as a vector of numbers encoded using attributes of the respective cyber-attack; and
   transforming the vector of numbers into a sequence signature using a deep learning neural network model.

7. The method of claim 1, wherein the representation of historic sequence signatures is generated during a learning period.

8. The method of claim 7, wherein comparing each sequence signature to the representation of historic sequence signatures further comprises:
   comparing at least subset representing historic sequence signatures to the generated sequence signature; and
   determining the partially matching sequence signature to be a historic sequence signature having a lowest distance metric.

9. The method of claim 8, wherein the comparison is performed using machine learning model generated during the learning period.

10. The method of claim 8, wherein the subset of historic sequence signatures includes a cluster of historic sequence signatures.

11. The method of claim 1, wherein the attack campaign is at least a DDoS attack campaign.

12. A non-transitory computer readable medium having stored thereon instructions for causing a processing circuitry to execute a process for predicting subsequent cyber-attacks in attack campaigns, the process comprising:
   receiving events data related to cyber-attacks occurring in a network during a predefined time window;
   extracting at least one sequence of attacks from the received events data at least one attack vector;
   generating a sequence signature for each of the at least one extracted sequence using an embedding process based on a trained embedding model;
   comparing each sequence signature to a representation of historic sequence signatures to determine at least partially matching sequence signature; and
   based on the matching sequence, determining at least one subsequent cyber-attack in a respective sequence.

13. A system for predicting subsequent cyber-attacks in attack campaigns comprising:
a processing circuitry; and
a memory, the memory containing instructions that, when executed by the processing circuitry, configure the system to:
receive events data related to cyber-attacks occurring in a network during a predefined time window;
extract at least one sequence of attacks from the received events data at least one attack vector
generate a sequence signature for each of the at least one extracted sequence using an embedding process based on a trained embedding model;
compare each sequence signature to a representation of historic sequence signatures to determine at least partially matching sequence signature; and
determine, based on the matching sequence, at least one subsequent cyber-attack in a respective sequence.

14. The system of claim 13, wherein the sequence includes a series of cyber-attacks occurred during the same time window and against a targeted protected object.

15. The system of claim 13, wherein the embedding process to generate the sequence signature is an n-grams-based process.

16. The system of claim 15, wherein, when performing the n-gram-based embedding process, the system is further configured to:
break a sequence into a set of overlapping n-grams, wherein each n-gram is a sub-sequence of a length 'n', wherein an 'n' is an integer number; and
encode the set of overlapping n-grams with attack attributes of the respective cyber-attack.

17. The system of claim 13, wherein the embedding process is a neural network-based process.

18. The system of claim 17, wherein when performing the neural network-based embedding process, the system is further configured to:
represent each cyber-attack in the extracted sequence as a vector of numbers encoded using attributes of the respective cyber-attack; and
transform the vector of numbers into a sequence signature using a deep learning neural network model.

19. The system of claim 13, wherein the representation of historic sequence signatures is generated during a learning period.

20. The system of claim 19, wherein the system is further configured to:
compare at least subset representing historic sequence signatures to the generated sequence signature; and
determine the partially matching sequence signature to be a historic sequence signature having a lowest distance metric.

21. The system of claim 20, wherein the comparison is performed using machine learning model generated during the learning period.

22. The system of claim 20, wherein the subset of historic sequence signatures includes a cluster of historic sequence signatures.

23. The system of claim 13, wherein the attack campaign is at least a DDoS attack campaign.

* * * * *